United States Patent [19]

Son et al.

[11] Patent Number: 4,539,122

[45] Date of Patent: Sep. 3, 1985

[54] CORROSION INHIBITOR FOR HEAVY BRINES

[75] Inventors: Adelina J. Son; Mark S. Kuzlik, both of Houston, Tex.

[73] Assignee: Halliburton Company, Duncan, Okla.

[21] Appl. No.: 581,932

[22] Filed: Feb. 21, 1984

[51] Int. Cl.³ .................. E21B 33/13; E21B 43/11; E21B 43/00

[52] U.S. Cl. .................. 252/8.55 R; 252/8.55 E; 252/389 R

[58] Field of Search .............. 252/8.55 E, 389, 387, 252/8.55 R, 389.61, 38.62; 166/294-297

[56] References Cited

U.S. PATENT DOCUMENTS

| | | | |
|---|---|---|---|
| 2,913,420 | 11/1959 | Alderman et al. | 252/389 |
| 3,215,637 | 11/1965 | Clerbois | 252/387 |
| 4,046,197 | 9/1977 | Grvesbeck et al. | 166/305 |
| 4,317,735 | 3/1982 | Crowe | 252/8.55 C |
| 4,490,262 | 12/1984 | Stauffer et al. | 252/8.55 R |

FOREIGN PATENT DOCUMENTS 2027686  2/1980  United Kingdom .

OTHER PUBLICATIONS

Chem. Abstract 85: 150,846z, Kodama, 1976.

*Primary Examiner*—Theodore Morris
*Attorney, Agent, or Firm*—Robert A. Kent; Thomas R. Weaver

[57] ABSTRACT

The present invention provides a method for reducing the corrosive effects of a heavy brine upon a metal by admixing a quantity of a selected corrosion inhibitor with the brine solution. The corrosion inhibitor can comprise at least one member selected from the group consisting of a monovalent or divalent salt of erythorbic acid, a molybdate salt, ferrous gluconate and sodium gluconate. The brine solution can contain potassium, sodium, calcium or zinc halide salts. The corrosion inhibitor can be used in drilling, completion, packer and workover fluids.

16 Claims, 1 Drawing Figure

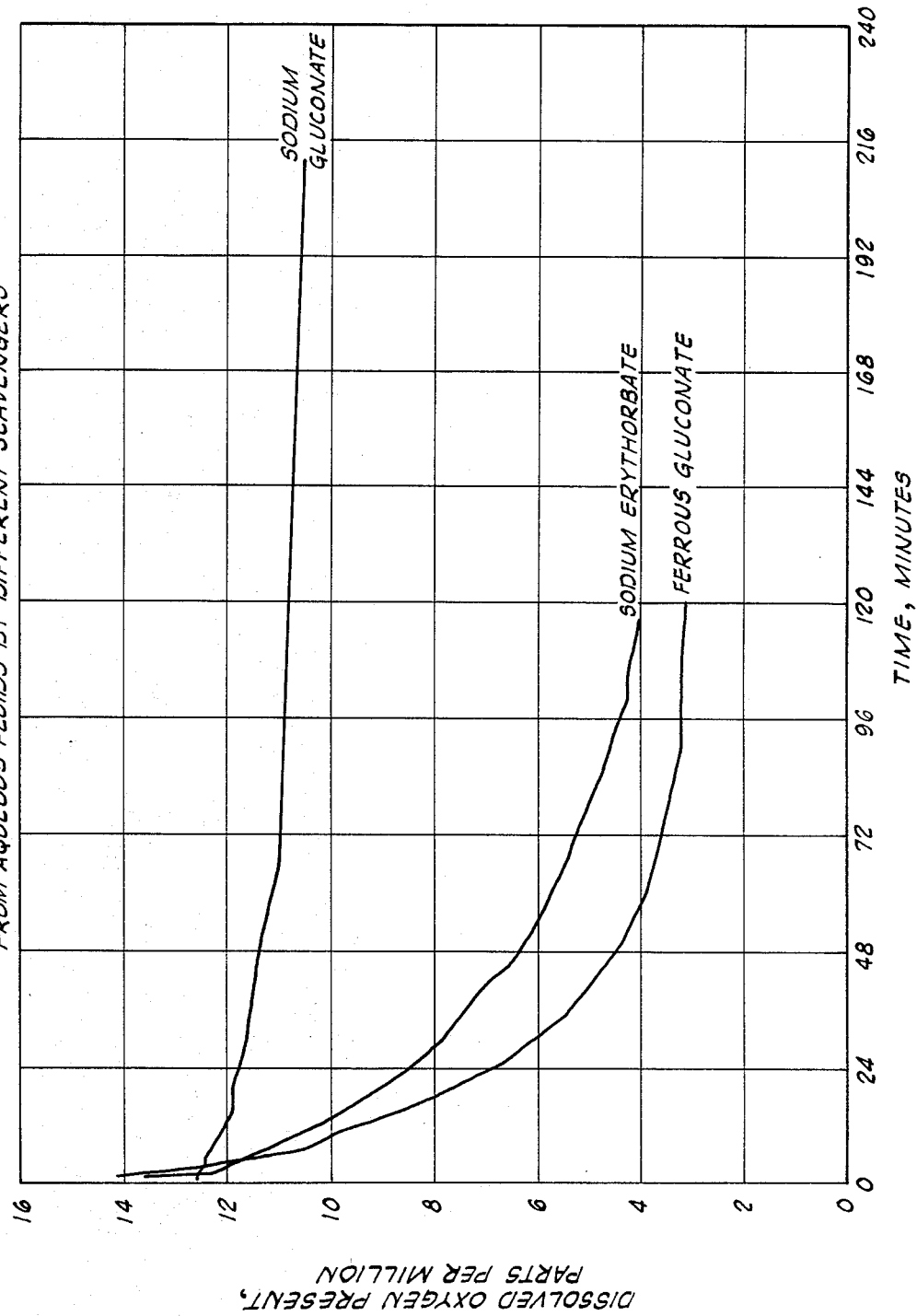

CORROSION INHIBITOR FOR HEAVY BRINES

BACKGROUND OF THE INVENTION

1. Field of the Invention

The present invention provides a pH independent corrosion inhibitor for use in the protection of metals from the corrosive effect of heavy brines and particularly zinc halide brines employed in the drilling, completion and workover of well bores penetrating subterranean formations.

2. Prior Art

In the drilling of a well bore into a subterranean formation, it is necessary to cool the drill bit as it cuts into the formation and to remove the drill cuttings from the well bore. Normally, a drilling fluid is circulated downwardly through the drill pipe within the well bore and outwardly through nozzles or openings in the drill bit. The drilling fluid then passes upwardly through the well bore annulus to the surface. Most drilling fluids contain suspended particles of hydrated clay in water. As the well bore is drilled, the suspended particles in the drilling fluid cause a filter cake to be formed on the face of the subterranean formation. The filter cake tends to seal off the formation and may result in the permanent reduction of permeability of the subterranean formation. To avoid impairment of permeability of producing intervals in a subterranean formation, it is necessary to use a "clean" drilling fluid which will not damage the formation, but which has sufficient density to maintain formation pressures. Similarly, during well completion and workover operations performed on a well bore, it also is desirable to employ dense, but non-damaging fluids.

Commonly employed non-damaging fluids are high density aqueous brine solutions. For example, calcium chloride solutions can be produced having a density up to about 11.7 pounds per gallon of solution. Calcium bromide can be used to produce aqueous brines having a density of up to about 14.2 pounds per gallon. The incorporation of solid calcium chloride pellets in the brine permits a fluid having a density of about 15 pounds per gallon to be formed. When heavy brine solutions having a density greater than 15 pounds per gallon are required, aqueous solutions of zinc halides, such as zinc chloride or zinc bromide, normally are employed either individually or as blends with calcium halides. Most of the heavy brine solutions are highly corrosive to metals and, therefore, require the addition of expensive inhibitors to the solutions to protect metal surfaces contacted by the fluids. Many corrosion inhibitors are useful only at selected temperature levels or pH ranges for the various heavy brines and dilution, temperature changes or any change which effects the pH of the brine often results in loss of the corrosion inhibition. Particular problems arise in the selection of corrosion inhibitors for use in zinc halide-containing heavy brine solutions. Many common corrosion inhibitors, such as organic thiophosphates, quaternized amines, polyphosphate esters, filming amines and the like form precipitates or are ineffective when admixed with zinc halide-containing heavy brine solutions.

It would be desirable to provide a corrosion inhibitor that is useful in retarding corrosion of metals in contact with heavy brine solutions and which does not precipitate from the solution upon addition or upon a change in the pH or temperature of the solution.

SUMMARY OF THE INVENTION

The discovery now has been made that the monovalent and divalent salts of erythorbic acid, when admixed in a sufficient amount with a heavy brine solution, will inhibit the corrosive effect of heavy brines upon metals in contact with the heavy brine solutions. More specifically, the salts of erythorbic acid, when admixed with a zinc halide-containing heavy brine solution, inhibit the corrosive effect of the brine upon metals and do not precipitate from the brine upon addition thereto or upon a change in pH or temperature of the solution.

The erythorbic acid salt can be added to the corrosive heavy brine solution in either solid or liquid form. The erythorbic acid salt also can be admixed with an effective amount of an alkali metal molybdate to provide corrosion inhibition to the heavy brine in excess of that provided by either salt alone.

DESCRIPTION OF THE DRAWING

The single graphical FIGURE illustrates the comparative rate of oxygen removal from an aqueous system by the composition of the present invention.

DESCRIPTION OF THE PREFERRED EMBODIMENT

In accordance with the present invention, a heavy brine solution is prepared by dissolution of a salt, such as for example, a potassium halide, sodium halide, calcium halide, zinc halide or admixture thereof in an aqueous fluid. The brine solution can have a density of from about 10 pounds per gallon to in excess of 19 pounds per gallon by varying the quantities of the various halide salts.

The heavy brine solution then is admixed with an effective amount of a corrosion inhibitor. The corrosion inhibitor comprises a monovalent or divalent salt of erythorbic acid, such as, for example, sodium erythorbate, potassium erythorbate, calcium erythorbate, magnesium erythorbate, zinc erythorbate, ammonium erythorbate or the like. A preferred erythorbic acid salt comprises sodium erythorbate. The erythorbic acid salt is admixed with the heavy brine solution in an amount of at least about 0.1 pound per barrel (ppb) of heavy brine solution.

The particular amount of erythorbic acid salt required to inhibit corrosion in a particular heavy brine will depend upon the temperature, density of the brine and the particular compounds employed to produce the brine. In general, the quantity of erythorbic acid salt required to inhibit corrosion of a heavy brine increases with increasing brine density and increasing temperature levels. Preferably, sufficient erythorbic acid salt is admixed with the brine to provide a concentration in the range of from about 0.1 to about 25 ppb of the heavy brine solution. Preferably, the corrosion inhibitor of the present invention is present in an amount of from about 0.1 to about 10 ppb of the heavy brine solution.

The corrosion inhibitor of the present invention has been found to be particularly effective in inhibiting the corrosive effect of heavy brines containing zinc halides upon metal surfaces contacted by the heavy brine.

The effectiveness of the erythorbic acid salts as a corrosion inhibitor does not appear to be affected by the pH of the heavy brine solution. The corrosion inhibitor of the present invention is effective in acidic and about neutral solutions. Calcium and zinc halide salts are known to precipitate from solutions in which they are present when the pH level of the solution is increased to above about neutral. Therefore, the general pH range in which the corrosion inhibitor of the present invention is utilized is from about 0 to about 8.

The corrosion inhibitor of the present invention, which comprises an erythorbic acid salt, is effective at inhibiting corrosion of a metal in contact with a brine solution over a wide temperature range. The corrosion inhibitor is effective over a temperature range of from about ambient temperature to a level in excess of about 350° F.

The corrosion inhibitor of the present invention can be admixed with a heavy brine in a liquid or solid form. Preferably, the corrosion inhibitor is added as a liquid solution or as a powder which is readily solubilized in the heavy brine. Any conventional mixing apparatus can be utilized to disperse the corrosion inhibitor within the heavy brine solution. Alternatively, the corrosion inhibitor can be admixed with an aqueous fluid to which various salts are to be added to produce a heavy brine.

The inhibited heavy brine solution can be used as hereinbefore described as a clean drilling fluid, a packer fluid, a completion fluid and in workover operations performed on a well bore which penetrates a subterranean formation.

The effectiveness of the corrosion inhibitor of the present invention can be enhanced in some heavy brine solutions by the addition of an effective amount of an alkali metal molybdate to the erythorbic acid salt. A preferred molybdenum salt is sodium molybdate.

The particular amount of the molybdate salt admixed with the heavy brine solution will depend upon the quantity of erythorbic acid salt, temperature, density of the brine and the particular compounds employed to produce the brine. In general, the quantity of molybdate salt employed with the erythorbic acid salt is in the range of from about 0.1 ppb to about 2 ppb.

Corrosion of ferrous metals in contact with the brines primarily is caused by dissolved oxygen, organic and inorganic contaminants. The corrosion inhibitor of the present invention is believed by the inventors to reduce corrosion through several mechanisms. While the mechanism of the present invention is not known, it is believed the corrosion inhibitor can act or function as an antioxidant, as a reducing agent, as an oxygen scavenger and as a chelating agent in the brine solutions.

When organic contaminants degrade through an oxidative reaction, oxygen is incorporated into the system. Monovalent and divalent erythorbic acid salts present in a solution containing organic contaminants have been found to be more reactive toward the oxidative reaction and are preferentially consumed. This reaction prevents organic contaminant-induced corrosion of a ferrous metal in contact with the solution. As a reducing agent, erythorbates donate a hydrogen atom through either a change of valence state of an atom or in the removal of oxygen from the system by the formation of water. In combination with the reducing action, the erythorbates of the present invention also provide chelating action. Iron, for example, is kept in the $Fe^0$ and $Fe^{+2}$ states by a combination of reduction and chelating to prevent oxidation of the iron to the $Fe^{+3}$ valence state.

To further illustrate the present invention, but not by way of limitation, the following examples are provided.

EXAMPLE I

To illustrate the effectiveness of the corrosion inhibitor of the present invention in heavy brine solutions of differing densities, the following tests were performed. Various brine solutions were prepared by mixing sufficient quantities of calcium chloride, calcium bromide and zinc bromide in the form of saturated or near saturated industrial fluids in quantities of an aqueous solution to produce heavy brines having the densities set forth in Table I, below. Tared mild steel (AISI 4130) coupons then were immersed in quantities of the various brines which are maintained at elevated temperatures for various periods of time to determine the relative corrosion rates of the steel coupons in the brines. Various quantities of the corrosion inhibitor of the present invention then are added to the remaining samples of the heavy brines and the corrosion tests are repeated with additional tared mild steel coupons. The inhibitor comprises sodium erythorbate in the tests. Upon completion of each test, the coupon is weighed and the corrosion rate of each coupon is determined. The relative reduction in the rate of corrosion resulting from use of the corrosion inhibitor of the present invention is determined by the following equation:

$$\% \text{ Corrosion Reduction} = \frac{C_1 - C_2}{C_1} \times 100$$

$C_1$ = Corrosion rate of sample in brine, mils/yr
$C_2$ = Corrosion rate of sample in brine with corrosion inhibitor, mils/yr.

TABLE I

| Test Solution Density, ppg | Inhibitor Concentration, ppb | Duration of Test, hrs. | Test Temperature, °F. | Corrosion Rate, mils/yr | Corrosion Reduction, % |
|---|---|---|---|---|---|
| 15.0 | 0 | 168 | 150 | 2.595 | — |
| 15.0 | 1 | 168 | 150 | 0.692 | 73.3 |
| 15.0 | 0 | 164 | 150 | 2.330 | — |
| 15.0 | 2 | 164 | 150 | 0.619 | 73.9 |
| 15.0 | 0 | 168 | 275 | 7.328 | — |
| 15.0 | 1 | 168 | 275 | 6.706 | 8.5 |
| 15.0 | 0 | 168 | 275 | 7.328 | — |
| 15.0 | 5 | 168 | 275 | 1.289 | 82.4 |
| 15.0 | 0 | 168 | 325 | 218.17 | — |
| 15.0 | 2 | 168 | 325 | 51.05 | 76.6 |
| 16.5 | 0 | 168 | 150 | 2.748 | — |
| 16.5 | 1 | 168 | 150 | 0.459 | 83.3 |
| 16.5 | 0 | 166 | 150 | 1.751 | — |
| 16.5 | 2 | 166 | 150 | 0.359 | 79.5 |
| 16.5 | 0 | 168 | 150 | 1.789 | — |
| 16.5 | 3 | 168 | 150 | 0.511 | 71.4 |
| 16.5 | 0 | 168 | 300 | 18.302 | — |
| 16.5 | 5 | 168 | 300 | 3.339 | 81.8 |
| 16.5 | 0 | 166 | 350 | 23.97 | — |
| 16.5 | 2 | 166 | 350 | 21.574 | 10.0 |
| 16.5 | 0 | 166 | 350 | 23.97 | — |
| 16.5 | 3 | 166 | 350 | 6.44 | 73.2 |
| 16.5 | 0 | 166 | 350 | 23.97 | — |
| 16.5 | 5 | 166 | 350 | 1.97 | 91.8 |
| 18.5 | 0 | 164 | 150 | 3.762 | — |
| 18.5 | 2 | 164 | 150 | 1.290 | 65.7 |
| 18.5 | 0 | 70 | 300 | 153.0 | — |
| 18.5 | 5 | 70 | 300 | 132.0 | 13.7 |
| 18.5 | 0 | 166 | 300 | 126.5 | — |
| 18.5 | 10 | 166 | 300 | 26.4 | 79.2 |

Test blanks are run in each of the samples of uninhibited brine because of the different contaminants that can be present in the industrial chemicals used to form the brine samples.

The data set forth in Table I clearly illustrates the effectiveness of the present invention in inhibiting corrosion in heavy brines. Further, temperature stability is demonstrated by effective operation at temperatures from about 150° F. to about 350° F. As illustrated by the data, corrosion rates increase as the temperature level and density of the brines increase. Therefore, as previously indicated, higher treatment levels are recommended for use at elevated temperatures with higher density brine solutions.

EXAMPLE II

The effectiveness of the corrosion inhibitor of the present invention comprising sodium erythorbate is compared to other compounds to illustrate the unexpected nature of Applicants' discovery.

Corrosion proceeds at an exponential rate, the corrosion rate being very rapid initially and then decaying exponentially to a maximum corrosion plateau. When tests are run having different durations, it is difficult to relate the efficiency of the corrosion inhibitor to the quantity of chemical used per barrel of fluid to be treated because the temperature of the test oven, the duration of each test, the dissolved oxygen present in a fluid sample and the contaminants present in different fluid samples are not exactly the same.

Accordingly, a heavy brine is prepared having a density of 16.5 ppg by admixing calcium chloride, calcium bromide and zinc bromide into a nearly saturated aqueous fluid. The tests set forth in Example I then are performed employing a quantity of the various compounds indicated in Table II. The compounds are admixed with the brine as aqueous solutions. The results of the tests are set forth in Table II, below.

TABLE II

| Compound | Concentration, ppb | Duration of Test hrs | Test Temperature F.° | Corrosion Reduction % |
|---|---|---|---|---|
| Potassium Citrate | 2 | 165 | 150 | 2.4 |
| Potassium Tartrate | 2 | 165 | 150 | −27.6[a] |
| Sodium Fumarate | 2 | —[b] | — | — |
| Sodium Ascorbate | 2 | —[b] | — | — |
| Sodium Erythorbate | 2 | 166 | 150 | 79.5 |
| Aspartic Acid | 2 | 168 | 150 | −113 |
| Sodium Aspartate | 2[c] | 256 | 150 | −140 |
| Fumaric Acid | 2 | 168 | 150 | −41 |
| Gluconic Acid | 2 | 168 | 150 | −55 |
| Citric Acid | 2 | 168 | 150 | −202 |
| Erythorbic Acid | 2 | 168 | 150 | −20 |
| Tartaric Acid | 2 | 168 | 150 | −243 |
| Ascorbic Acid | 2 | 168 | 150 | −0.4 |

[a]Negative value indicates corrosion rate was increased over rate of uninhibited brine solution
[b]Compound precipitated upon addition to brine
[c]15.5 ml solution used is equivalent to 2 ppb of the salt Surprisingly, the corrosion inhibitor of the present invention is effective in heavy brines while other antioxidants known for their ability to inhibit corrosion are either incompatible with the heavy brine or are not significantly effective in inhibiting corrosion of metals in contact with the brine. Sodium ascorbate, a stereoisomer of the corrosion inhibitor of the present invention, is incompatible with any heavy brine containing a zinc halide. Also erythorbic acid, from which the salts comprising the corrosion inhibitor of the present invention are produced, is not effective as a corrosion inhibitor as indicated by the data set forth in Table II.

EXAMPLE III

To illustrate the effect of a molybdate salt upon the corrosion inhibitor of the present invention, the following test was performed. Various brine solutions are prepared having the densities set forth in Table III, below, by admixing calcium chloride, calcium bromide and zinc bromide into an aqueous fluid. Various quantities of the corrosion inhibitor comprising sodium erythorbate and sodium molybdate then are admixed with samples of the heavy brine solutions. The tests set forth in Example I then are performed. The results of the tests are set forth in Table III, below.

TABLE III

| Test Solution Density, ppg | Inhibitor Concentration, ppb | Molybdate Concentration, ppb | Duration of Test, hrs | Test Temperature, °F. | Corrosion Reduction, % |
|---|---|---|---|---|---|
| 16.5 | 2 | 0 | 170 | 150 | 78.9 |
| 16.5 | 2 | 0.5 | 170 | 150 | 82.9 |
| 16.5 | 2 | 1.0 | 170 | 150 | 79.8 |
| 18.5 | 2 | 0 | 164 | 150 | 65.7 |
| 18.5 | 2 | 0.1 | 164 | 150 | 70.6 |
| 18.5 | 2 | 1.0 | 166 | 150 | 64.4 |

The use of the molybdate salt in combination with the erythorbic acid salt of the present invention in various heavy brines clearly can improve the effectiveness of the corrosion inhibitor, if the molybdate salt concentration is maintained within predetermined concentration levels.

EXAMPLE IV

To illustrate the effectiveness of different monovalent and divalent salts of erythorbic acid, the following test was performed. A brine solution was prepared having a density of 16.5 lbs. per gallon by admixing calcium bromide and zinc bromide into an aqueous fluid. A quantity of various salts of erythorbic acid was admixed with a sample of the brine. The tests set forth in Example I then are performed. The results of the tests are set forth in Table IV, below.

TABLE IV

| Corrosion Inhibitor | Inhibitor Concentration, ppb | Duration of Test, hrs. | Test Temperature, °F. | Corrosion Rate, mils/yr | Corrosion Reduction, % |
|---|---|---|---|---|---|
| None | 0 | 166 | 150 | 2.664 | — |
| Sodium Erythorbate | 2 | 166 | 150 | 0.755 | 71.7 |
| Potassium Erythorbate | 2 | 166 | 150 | 0.707 | 73.5 |
| None | 0 | 168 | 150 | 2.434 | — |
| Sodium Erythorbate | 1 | 168 | 150 | 0.404 | 83.4 |
| Potassium Erythorbate | 1 | 168 | 150 | 0.496 | 79.6 |
| Calcium Erythorbate | 1 | 168 | 150 | 0.417 | 82.9 |
| Magnesium Erythorbate | 1 | 168 | 150 | 0.419 | 82.8 |
| None | 0 | 165 | 150 | 2.751 | — |
| Zinc Erythorbate | 1 | 165 | 150 | 0.464 | 83.1 |
| Ammonium Erythorbate | 1 | 165 | 150 | 0.414 | 84.1 |
| None | 0 | 168 | 300 | 18.302 | — |
| Sodium Erythorbate | 5 | 168 | 300 | 3.339 | 81.8 |
| Potassium Erythorbate | 5 | 168 | 300 | 6.104 | 66.7 |

TABLE IV-continued

| Corrosion Inhibitor | Inhibitor Concentration, ppb | Duration of Test, hrs. | Test Temperature, °F. | Corrosion Rate, mils/yr | Corrosion Reduction, % |
|---|---|---|---|---|---|
| Calcium Erythorbate | 5 | 168 | 300 | 10.240 | 44.1 |
| Magnesium Erythorbate | 5 | 168 | 300 | 5.279 | 71.2 |

The data set forth above clearly demonstrates the effectiveness of the monovalent and divalent salts of erythorbic acid in inhibiting the corrosive effect of heavy brines, and particularly zinc halide-containing brines, upon metals in contact with the brines.

The salts of erythorbic acid are fairly stable in aqueous solutions, however, under acidic or aerobic conditions the salt can decarboxylate and be converted to furfural. The calcium salt of erythorbic acid has been observed to have a greater tendency to undergo this transformation than other salts of erythorbic acid. The reduced efficiency of calcium erythorbate at 300° F. in the preceding Example IV is believed to be attributable to the partial conversion of the compound to furfural. Furfural has biocidal rather than anticorrosion properties. Upon performing the test set forth in Example IV at 300° F. with calcium erythorbate and 0.1 ppb sodium molybdate, the efficiency of the corrosion inhibition was improved from the level of 44.1% corrosion reduction for calcium erythorbate, alone, to a level of 54.5% corrosion reduction.

EXAMPLE V

Various other metallic salts have been found to reduce corrosion in heavy brines, but generally at a lesser degree than the monovalent and divalent salts of erythorbic acid. Various brine samples are prepared as described in Example III and quantities of the various compounds are added to the brine samples. The data set forth in Table V are the results of corrosion tests performed as described in Example I at a temperature of 150° F.

TABLE V

| Compound | Concentration, ppb | Test Solution Density, ppg | Duration of Test, Hours | Corrosion Reduction, % |
|---|---|---|---|---|
| Potassium citrate | 2 | 15.0 | 165 | 37.8 |
|  | 2 | 16.5 | 166 | 18.6 |
|  | 2 | 18.5 | 165 | 1.5 |
| Ferrous gluconate | 2 | 16.5 | 165 | 64.1 |
|  | 2 | 18.5 | 165 | 28.3 |
|  | 2 | 18.5 | 184 | 66.3 |
| Sodium gluconate | 2 | 15.0 | 168 | 89.5 |
|  | 2 | 16.5 | 168 | 31.3 |
|  | 2 | 18.5 | 168 | 46.8 |
| Sodium erythorbate | 2 | 15.0 | 164 | 73.9 |
|  | 2 | 16.5 | 166 | 79.5 |
|  | 2 | 18.5 | 164 | 65.7 |

The data clearly illustrates the effectiveness of ferrous gluconate and sodium gluconate, in addition to the monovalent and divalent salts of erythorbic acid, as corrosion inhibitors to reduce the corrosive effects of heavy brines. The gluconate salts are effective at generally the same concentration ranges as the salts of erythorbic acid. However, the specific quantity required for any particular conditions normally is different from that necessary to provide the same degree of corrosion protection as achieved by the monovalent and divalent salts of erythorbic acid.

The oxygen scavenging ability of the erythorbate and gluconate salts was determined at room temperature in deionized water using an Orion oxygen probe manufactured by Orion Research, Inc., Cambridge, Mass. Two (2) ppb of the various salts were added to each sample. Within two hours, the sodium erythorbate removed 70 percent of the dissolved oxygen in the deionized water while the ferrous gluconate removed 78 percent. Sodium gluconate removed only 16.7 percent in 3.5 hours. The comparative rate of oxygen removal is shown in the single drawing FIGURE. The data set forth in the FIGURE clearly demonstrates that oxygen scavenging is a function of the corrosion inhibitor in the mechanism of the present invention, but it is not the sole reason for the effectiveness of either the monovalent and divalent salts of erythorbic acid or the gluconate salts.

The various salts of erythorbic acid can be produced by the neutralization of erythorbic acid produced by acidifying sodium erythorbate. Sodium erythorbate is prepared from D-glucose by a combination of chemical and biochemical synthesis through the intermediate 2-keto-D-gluconic acid by treating with sodium methoxide as disclosed by the methods identified in *The Merck Index*, Ninth Edition. The potassium salt is produced by neutralization of erythorbic acid with potassium hydroxide. Other salts are formed by neutralization of erythorbic acid with ammonium hydroxide, magnesium hydroxide, zinc hydroxide, calcium hydroxide and the like.

While that which presently is considered to be the preferred embodiment of the invention has been described herein, it is to be understood that changes or modifications can be made in the method and composition disclosed by individuals skilled in the art without departing from the spirit or scope of the invention as defined in the appended claims.

What is claimed is:

1. A method of inhibiting corrosion of ferrous metals in contact with heavy brine solutions containing at least one heavy salt selected from the group consisting of potassium halides, sodium halides, calcium halides and zinc halides, said solutions having a density in excess of about 10 lbs/gallon comprising admixing with said brine solution a corrosion inhibitor comprising a monovalent or divalent salt of erythorbic acid, said inhibitor being present in an amount of at least about 0.1 pound per barrel of said brine solution.

2. The method of claim 1 wherein said erythorbic acid salt is present in an amount of from about 0.1 to about 25 pounds per barrel of said brine solution.

3. The method of claim 1 wherein said brine solution has a pH level in the range of from acidic to about neutral.

4. The method of claim 1 wherein said brine solution is at a temperature in the range of from about ambient temperature to in excess of about 350° F.

5. The method of claim 1 wherein said corrosion inhibitor contains an effective amount of a molybdate salt.

6. The method of claim 5 wherein said molybdate salt is present in an amount of from about 0.1 to about 2 pounds per barrel.

7. The method of claim 1 wherein said erythorbic acid salt is present in an amount of from 0.1 to about 10 pounds per barrel of said brine solution.

8. The method of claim 1 wherein said monovalent or divalent salt of erythorbic acid comprises at least one member selected from the group consisting of sodium erythorbate, potassium erythorbate, calcium erythorbate, magnesium erythorbate, zinc erythorbate and ammonium erythorbate.

9. A method for protecting metals from the corrosive effects of heavy brine solutions having a density in excess of about 10 lbs/gallon comprising:

admixing with said brine solution comprising at least one salt selected from the group consisting of potassium halides, sodium halides, calcium halides and zinc halides, a corrosion inhibitor comprising a monovalent or divalent salt of erythorbic acid in an amount in excess of about 0.1 pound per barrel of said brine solution whereby the corrosive effects of said heavy brine solution upon said metals are reduced.

10. The method of claim 9 wherein said corrosion inhibitor includes a molybdate salt.

11. The method of claim 9 wherein said corrosion inhibitor is present in an amount of from about 0.1 to about 25 pounds per barrel of said heavy brine solution.

12. The method of claim 9 wherein said heavy brine solution is at a temperature in the range of from about ambient to in excess of about 350° F.

13. The method of claim 9 wherein said monovalent or divalent salt of erythorbic acid comprises at least one member selected from the group consisting of sodium erythorbate, potassium erythorbate, calcium erythorbate, magnesium erythorbate, zinc erythorbate and ammonium erythorbate.

14. A corrosion inhibitor composition for use in heavy brine solutions having a density in excess of 10 pounds per gallon comprising at least one member selected from the groups consisting of a monovalent or divalent salt of erythorbic acid, sodium gluconate and ferrous gluconate.

15. The composition of claim 14 defined further to contain a molybdate salt.

16. The composition of claim 14 wherein said heavy brine comprises a zinc halide-containing heavy brine solution.

* * * * *